United States Patent [19]

Beilman et al.

[11] 4,074,570

[45] Feb. 21, 1978

[54] FLUID SPEED MEASURING APPARATUS

[75] Inventors: John L. Beilman, Lancaster; William R. Deazley, Cowlesville, both of N.Y.

[73] Assignee: Calspan Corporation, Buffalo, N.Y.

[21] Appl. No.: 777,876

[22] Filed: Mar. 15, 1977

[51] Int. Cl.² .............................................. G01C 21/10
[52] U.S. Cl. .................................... 73/182; 73/178 R
[58] Field of Search ................. 73/178 R, 178 H, 181, 73/182, 189, 212

[56] References Cited

U.S. PATENT DOCUMENTS

| 2,846,878 | 8/1958 | Carbonara | 73/212 |
| 3,373,605 | 3/1968 | Beilman | 73/178 |

Primary Examiner—Herbert Goldstein
Attorney, Agent, or Firm—Allen J. Jaffe; David J. Zobkiw

[57] ABSTRACT

This invention relates to low range fluid speed sensors for the measurement of fluid currents in any direction, down to near zero velocity for dense fluids. Two signals with a 90° space phase relationship are used which permits the instantaneous resolution of the fluid speed vector into its two orthogonal components.

11 Claims, 7 Drawing Figures

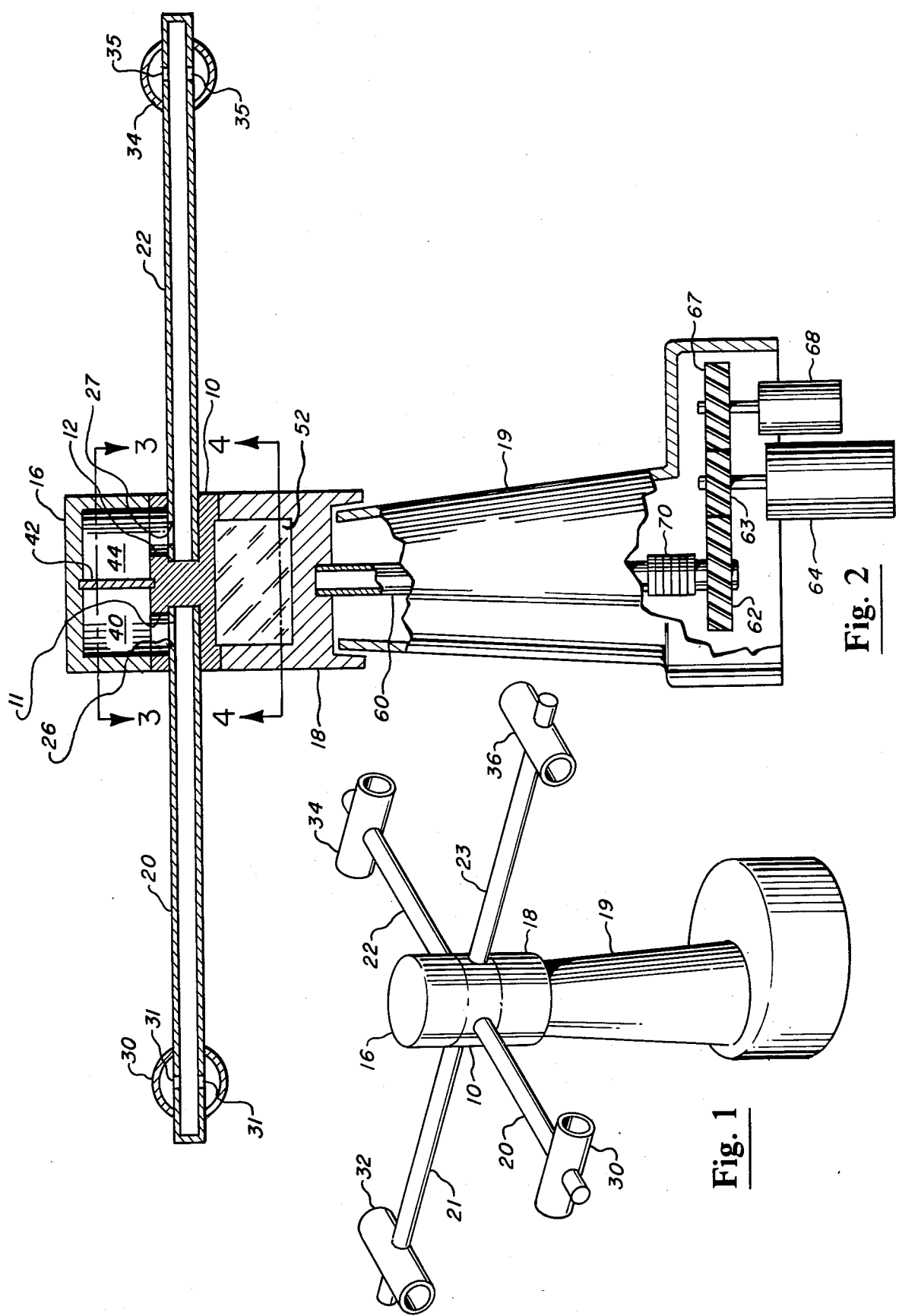

FLUID SPEED MEASURING APPARATUS

BACKGROUND OF THE INVENTION

The present invention relates to fluid speed indicators and, more particularly, to fluid speed indicators that are sensitive to very low fluid velocities and is an improvement of U.S. Pat. Nos. 3,373,605, 3,400,584 and 3,726,139. In these earlier patents, the disclosed airspeed indicators comprise two rotating pitot or venturi tubes which sense the cyclic variations in pressure as the tubes move into and away from the direction of flight. In these devices the variations are proportional to the forward velocity or airspeed of the vehicles to which the indicators are attached.

With the apparatus of the above-mentioned patents the measurements result in a sinusoidally modulated pressure signal at the rotor rotational frequency. In the resolving process, this signal is multiplied by the sine and cosine components of the rotational angle. The resulting outputs are two sinusoids which are of the form $$V \sin^2 \omega t = (V/2) + (V/2)(\sin 2 \omega t)$$

The oscillatory output, $\sin 2 \omega t$, must be filtered out to obtain the steady $V/2$ terms. This filtering restricts the bandwidth of the measurement.

Additionally, with the apparatus of the above-mentioned patents, the rotor for rotating the sensing tubes must be driven at a relatively high rotational speed to insure a suitable response time. This necessitates higher rotor drive power requirements which increases the tendency for centrifugal pumping or whirl effects that have to be corrected, as by the addition of airfoils. Thus a choice of reducing the speed of the arms supporting the tubes and thereby reducing the power requirements and whirl effects as well as eliminating the need for airfoils is given at a price of lowering the response time of the instrument with the lowering of the RPM.

SUMMARY OF THE INVENTION

The foregoing disadvantages are overcome according to the teachings of the present invention which provides a fluid speed indicator which permits wide bandwidth measurements that are not limited by the rotor speed. Since the rotor speed is not critical, lower speeds can be taken advantage of to reduce rotor drive power requirements and the tendency for centrifugal pumping effects. Reduced rotor speed also results in less wear on the bearings, sliprings and the like as well as a less critical need for rotor balancing. When measuring water currents, measurements down to near zero velocity may be made, however, for less dense fluids, such as air, the need for a reasonable tip speed in order to have the necessary gain $$\left( \frac{\Delta P}{v} \right),$$

argues against too low a speed.

It is an object of this invention to provide apparatus for measuring water currents in any direction, down to near zero velocity.

It is a further object of this invention to provide apparatus for the measurement of gust spectra, airport wind velocity, direction, and turbulence levels and V/STOL aircraft flight displays.

It is an additional object of this invention to provide an apparatus which permits a lower rotational rate for the sampling of the fluid stream.

It is an additional object of this invention to provide a low range speed measuring system that can be used in any fluid medium for wide bandwidth velocity measurements without requiring excessive drive motor power.

It is a further object of this invention to provide a measuring apparatus having reduced drive power requirements.

It is a still further object of this invention to provide a measuring apparatus having a reduced deadband around the zero velocity region. These objects, and others as will become apparent hereinafter, are accomplished by the present invention.

Basically, the present invention comprises four rotating tubes or arms making up two sets of sensors oriented at right angles to each other. Velocity or pressure sensing means are located at the tips of each tube or arm. The fluid speed derived pressure signals from each of the two pairs of diametrically located tubes containing sensing means are the two components of the fluid speed vector 90° out of phase with each other. It has been found that, as will be discussed in greater detail hereinbelow, with this configuration the measurement does not have the oscillatory output. As a result, rotor speed dependent filtering is not required and the measurement bandwidth is limited only by the fluid pressure system lags and the disc diameter versus wave lengths of the fluid mass velocity variations.

BRIEF DESCRIPTION OF THE DRAWINGS

For a fuller understanding of the present invention reference should now be had to the following detailed description of the same taken in conjunction with the accompanying drawings in which:

FIG. 1 is a perspective view of the device;

FIG. 2 is a partial sectional view of the device;

DESCRIPTION OF THE PREFERRED EMBODIMENT

Figure 5:
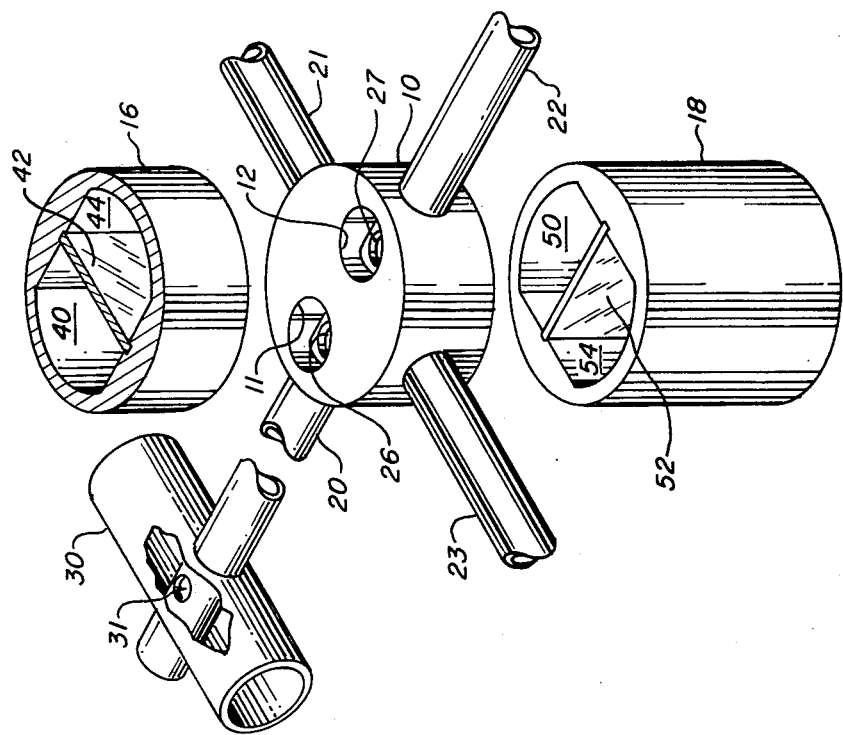
FIG. 5 is an exploded view of the section of FIG. 3.
Figure 3:
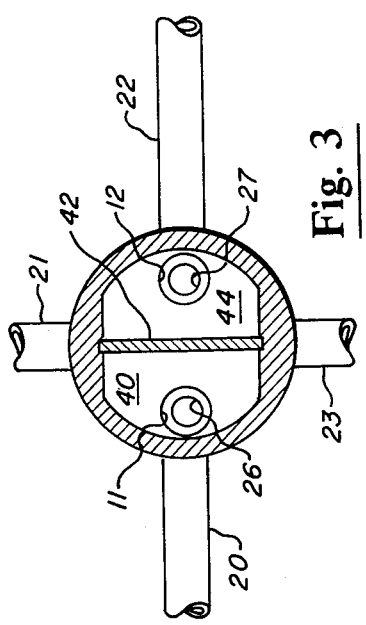
FIG. 3 is a sectional view taken along line 3—3 of FIG. 2.
Figure 4:
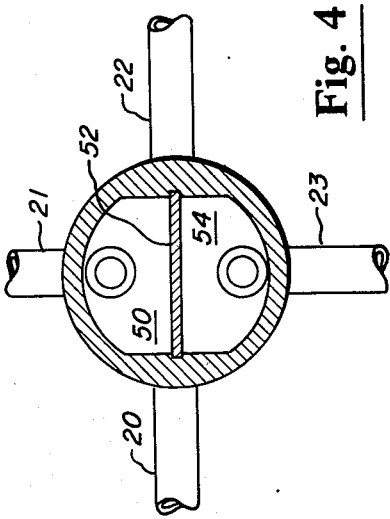
FIG. 4 is a sectional view taken along line 4—4 of FIG. 2.

Referring to FIGS. 1–5, the device has two pairs of diametrically located tubular arms at right angles to each other. The arms 20, 21, 22 and 23 are of equal length and are rigidly mounted in bores in central hub 10. Member 16 is sealingly attached to hub 10 and together with differential pressure sensing diaphragm and transducer 42 defines chambers 40 and 44. Similarly, member 18 is sealingly attached to hub 10 and together with differential pressure sensing diaphragm and transducer 52 defines chambers 50 and 54. Venturis, or functionally similar devices, 30, 32, 34 and 36 are located on arms 20, 21, 22 and 23, respectively at equal radii from the central hub 10. Each of the arms 20–23 is hollow and each diametrically located pair of arms forms a part of the fluid connection between their respective venturis or functionally similar devices and opposing sides of a differential pressure sensing diaphragm and transducer. Venturi 30 communicates with chamber 40 via openings 31, hollow arm 20, port 26 and bore 11. Venturi 34 communicates with chamber 44 via openings 35, hollow arm 22, port 27 and bore 12. The existence of a difference in pressure between chambers 40 and 44 will cause the flexing or bending of separating diaphragm and transducer 42 in an amount proportional to the extent of the differential pressure. In a similar manner, venturis 32 and 36 communicate with chambers 50 and 54, respectively, which are separated by diaphragm and transducer 52. The transducer portion of diaphragm and transducer 42 and 52 may be mounted in or on the diaphragm and may be any suitable transducer for converting the movement of diaphragm 24 into an electrical signal, as for example, a variable reluctance type pickoff, or simply, a strain gauge pickoff.

The unit defined by hub 10 and members 16 and 18 is mounted for rotation relative to housing 19 and is connected via hollow shaft 60 and gear 62 with gear 63 of driving motor 64 and gear 67 of two-phase - to - two-phase resolver 68. The electrical signal outputs of the transducers 42 and 52 are conveyed to the electronic portion of the apparatus by means of slipring and brush assembly 70. The transducers 42 and 52 are connected to slipring and brush assembly 70 through hollow shaft 60 by electrical connections (not shown).

Figure 6:
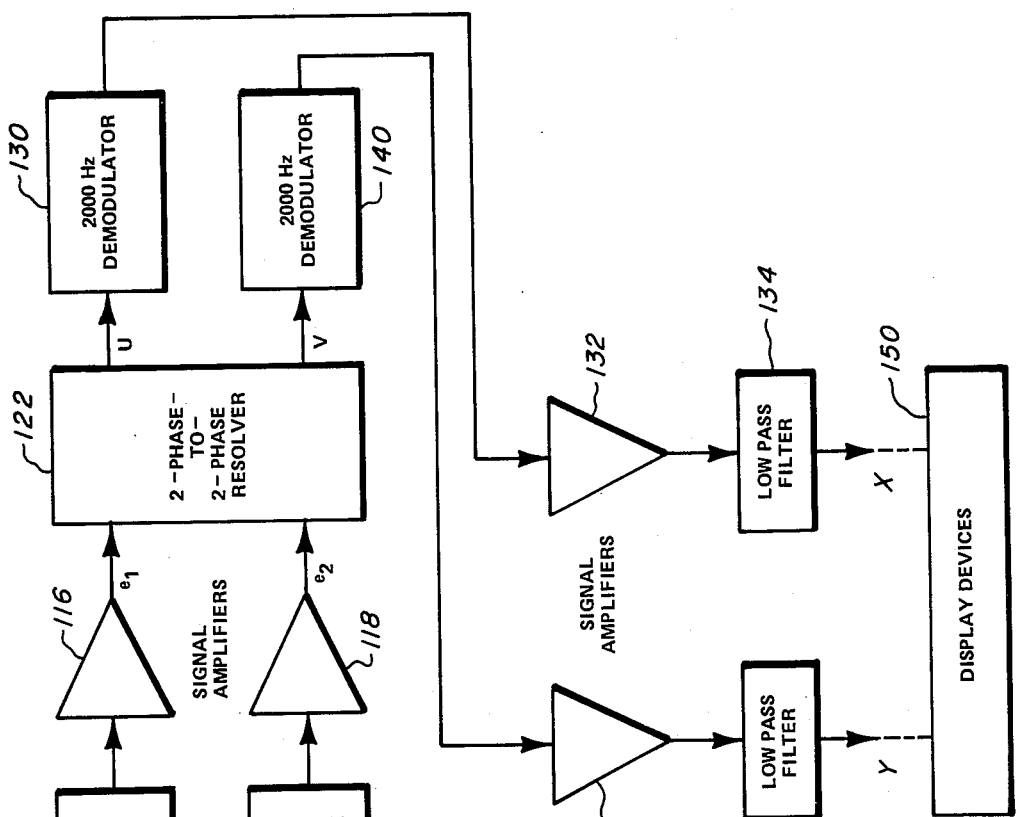
FIG. 6 is a block diagram of a modified system.

Referring now to FIG. 6, solid state 2000 Hz inverter 100 excites rotating differential pressure gauges 110 and 112 which correspond to transducers 42 and 52 of FIGS. 2-5. The output signals of gauges 110 and 112 are amplified by signal amplifiers 116 and 118, respectively, and their output signals, $e_1 = kV \sin \omega t_1 \sin 2000 t_2$ and $e_2 = kV \cos \omega t_1 \sin 2000 t_2$, respectively, are supplied to two-phase - to - two-phase resolver 122. A first output, $U = kV \cos \phi \sin 2000 t_2$, of two-phase resolver 122 is sequentially acted upon by 2000 Hz demodulator 130, signal amplifier 132 and low pass filter 134 before being supplied as a first input, $X = kV \cos \phi$, to the display devices 150. A second output, $V = kV \sin \phi \sin 2000 t_2$, of two-phase - to - two-phase resolver 122 is sequentially acted upon by 2000 Hz demodulator 140, signal amplifier 142 and low pass filter 144 before being supplied as a second input, $Y = kV \sin \phi$, to display devices 150.

In operation, the fluid speed indicating apparatus may be mounted on an aircraft to measure the airspeed thereof, or it may be used as an anemometer to measure wind velocities, or it may be mounted on a submarine to measure water currents, etc. The arms 20-23 are driven at a constant speed by driving motor 64 through the gear train. Two-phase - to - two-phase resolver 68 which is connected to driving motor 64 through the gear train provides 90° space phased signal voltages with non-oscillatory terms for the differential pressure derived transducer output voltages $e_1$ and $e_2$. Regardless of the particular application, the unit functions as described in U.S. Pat. No. 3,400,584 to sense the cyclic pressure variations at the throats of venturis 30, 32, 34 and 36 due to the alternate movement of arms 20-23 into and out of the direction of relative fluid flow. Since two pairs of arms and venturis are employed, both sine and cosine components of the fluid speed are available from the system described. By resolving these two components in the rotating frame of reference into the nonrotating frame of reference one can obtain the instantaneous fluid speed components relative to the nonrotating (vehicle) frame.

As a further way of explaining the basic concept consider the following mathematical discussion of the measurement method.

Figure 7:
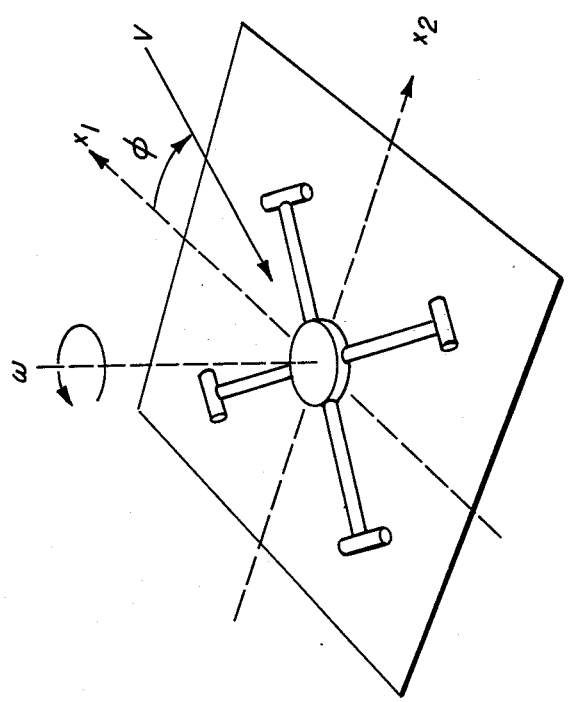
FIG. 7 is a diagram of the geometry of a two phase probe unit.

If two single phase probe assemblies are rotating in the same plane at 90° apart, as shown in FIG. 7, in a flow field having a velocity V, then it is readily apparent that the sinusoidal pressure signals from the two sensors will have a phase separation of 90°. Considering the simplified situation where these two signals are represented by the voltages $$e_1 = kV \sin \omega t$$

$$e_2 = kV \cos \omega t$$

where $\omega$ is the angular velocity of the sensors, then for resolver outputs of the form $$x_1^o = e_1 \sin \omega t + e_2 \cos \omega t$$

$$x_2^o = -e_1 \cos \omega t + e_2 \sin \omega t$$

the resulting output would be $$x_1^o = kV (\sin^2 \omega t + \cos^2 \omega t) = kV$$

$$x_2^o = kV (-\sin \omega t \cos \omega t + \sin \omega t \cos \omega t) = 0$$

As a simple extension consider the case where the flow direction is rotated by an angle $\phi$. This rotation can be shown to be equivalent to a change in the sensor signals to $$e_1 = kV \sin (\omega t - \phi)$$

$$e_2 = kV \cos (\omega t - \phi)$$

Substitution into the resolver equations and use of trigonometric identities results in $$x_1^o = kV (\sin^2 \omega t \cos \phi - \sin \omega t \cos \omega t \sin \phi + \cos^2 \omega t \cos \phi + \sin \omega t \cos \omega t \sin \phi) = kV \cos \phi$$

$$x_2^o = kV (-\cos \omega t \sin \omega t \cos \phi + \cos^2 \omega t \sin \phi + \sin \omega t \cos \omega t \cos \phi + \sin^2 \omega t \sin \phi) = kV \sin \phi$$

Hence, for flow directions at an angle $\phi$, the two outputs of the resolver system will be the two orthogonal components of velocity and the $\omega t$ oscillating term due to the rotation of the sensor arms is not in either output. This latter feature obviates the need for any filtering other than that required for reducing turbulence effects and for a.c. carrier demodulation.

This discussion is on the basis that the sensor detects the velocity differences of the rotating sensor arms with a pair of pitot tubes. If a venturi effect is used instead as the primary method for sensing the velocity differences, the equations developed above will remain the same except the term $2\rho V\omega$ will be multiplied by a constant determined by the geometry of the venturi.

Increased sensitivities are possible with venturi methods, if needed, and experience has indicated that only a relatively small contraction is necessary to obtain adequate signal levels. The other more significant advantage of using a venturi is that, because the venturi can be made symmetrical, it is possible to measure velocities greater than the sensor rotational tip velocities.

Strictly speaking, as illustrated and described, venturis 30, 32, 34 and 36 are not venturis but are functionally similar devices since they do not have single throats, but rather, each has a pair of parallel throats due to the presence of arms 20 - 23 in the flow paths.

Although a preferred embodiment of the present invention has been illustrated and described, other changes will occur to those skilled in the art. For example, the diaphragm need not be integral with a transducer, but rather, may be part of a differential pressure gage in which the pressure ports communicate with the pressure gage or some other conventional structure may be employed to measure the pressures. The frequency of the inverter 100 may be changed. The present invention may be used to obtain helicopter and submarine velocity measurements. It is therefore intended that the scope of the present invention is to be limited only by the scope of the appended claims.

We claim:

1. A fluid speed indicating apparatus for mounting on a movable body comprising:
   hub means;
   a first pair of generally aligned, tubular arms mounted in said hub means;
   a second pair of generally aligned, tubular arms mounted in said hub means perpendicular to said first pair of arms;
   means for rotating said hub means and thereby said first and second pairs of arms at a substantially constant angular speed;
   four fluid pressure sensing means mounted respectively to each arm of said first and second pair of arms at the same radial distance;
   first pressure responsive means operatively connected to said fluid pressure sensing means attached to said first pair of arms for sensing the steady state pressure difference between the fluid pressure sensing means attached to said first pair of arms and for producing a first signal whose amplitude is proportional to the magnitude of the velocity of fluid flow past said fluid pressure sensing means attached to said first pair of arms;
   second pressure responsive means operatively connected to said fluid pressure sensing means attached to said second pair of arms for sensing the steady state pressure difference between the fluid pressure sensing means attached to said second pair of arms and for producing a second signal whose amplitude is proportional to the magnitude of the velocity of fluid flow past said fluid pressure sensing means attached to said second pair of arms;
   whereby the amplitude of said first and second signals is proportional to the magnitude of the velocity of flow past said fluid pressure sensing means and varies at the rotational frequency at which said means for rotating said hub means is rotating said first and second pair of arms and the complete sine and cosine components of the velocity of the body are obtained.

2. The apparatus of claim 1 further including a two-phase - to - two-phase resolver means for providing reference voltage signals whereby the body axis velocity components are obtainable in non-oscillatory form.

3. The apparatus of claim 1 wherein said fluid pressure sensing means are functionally similar to venturis.

4. The apparatus of claim 1 wherein said first and second fluid pressure responsive means each includes a transducer unit including a pair of chambers separated by a differential pressure sensing diaphragm.

5. The apparatus of claim 1 wherein said first and second fluid pressure responsive means each includes a differential pressure gage.

6. A fluid speed indicating apparatus for mounting on a body comprising:
   hub means;
   means for rotating said hub means about an axis at a substantially constant angular speed;
   four fluid pressure sensing means mounted on said hub means at a 90° spacing and at the same radial distance from said axis;
   first fluid pressure responsive means operatively connected to two of said fluid pressure sensing means spaced 180° apart for sensing the steady state pressure difference between said two fluid pressure sensing means and for producing a first signal whose amplitude is proportional to the magnitude of the velocity of fluid flow past said two fluid pressure sensing means;
   second fluid pressure responsive means operatively connected to the other two of said fluid pressure sensing means spaced 180° apart for sensing the steady state pressure difference between said other two fluid pressure sensing means and for producing a second signal whose amplitude is proportional to the magnitude of the velocity of fluid flow past said other two fluid pressure sensing means;
   whereby the amplitude of said first and second signals varies at the rotational frequency at which said means for rotating said hub means is rotating said four fluid pressure sensing means and the complete sine and cosine components of the velocity of the body are obtained.

7. The apparatus of claim 6 further including a two-phase - to - two-phase resolver means for providing reference voltage signals whereby the body axis velocity components are obtainable in non-oscillatory form.

8. The apparatus of claim 6 wherein said fluid pressure sensing means include means that are functionally similar to venturis.

9. The apparatus of claim 6 wherein said first and second fluid pressure responsive means include a transducer unit including a pair of chambers separated by a differential pressure sensing diaphragm.

10. The apparatus of claim 6 wherein said first and second fluid pressure responsive means each includes a differential pressure gage.

11. A method for obtaining axis velocity components of a moving body including the steps of:
    rotating four fluid pressure sensors spaced at 90° intervals at a substantially constant speed about an axis;
    determining the steady state pressure difference between a first pair of said fluid pressure sensors spaced at 180° and producing a first signal whose amplitude is proportional to the magnitude of the velocity of fluid flow past said first pair of fluid pressure sensors;
    determining the steady state pressure difference between a second pair of said fluid pressure sensors spaced at 180° and producing a second signal whose amplitude is proportional to the magnitude of the velocity of fluid flow past said second pair of fluid pressure sensors;
    whereby the amplitude of said first and second signals varies at the rotational frequency at which said four fluid pressure sensors are rotated and the complete sine and cosine components of the velocity of the body are obtained.

* * * * *